United States Patent [19]

Carroll et al.

[11] Patent Number: 4,914,543

[45] Date of Patent: Apr. 3, 1990

[54] VARIABLE CAPACITANCE

[76] Inventors: Norman L. Carroll, 16 Circle Dr., Bakerstown, Pa. 15007; Gregory A. Bertone, 448 Blackberry Dr., Monroeville, Pa. 15146; Willard L. Pearce, 2315 Big Rock Rd., Allison Park, Pa. 15101

[21] Appl. No.: 382,303

[22] Filed: Jul. 20, 1989

[51] Int. Cl.⁴ ................... H01G 5/12; H01G 4/02
[52] U.S. Cl. ........................... 361/294; 361/326
[58] Field of Search .......... 361/292, 294, 295, 302, 361/326

[56] References Cited

U.S. PATENT DOCUMENTS

| | | | |
|---|---|---|---|
| 2,344,239 | 3/1944 | Finch | 361/326 |
| 3,566,222 | 2/1971 | Wolfendale et al. | 361/294 X |
| 3,570,003 | 3/1971 | West | 361/294 X |
| 3,702,957 | 9/1972 | Wolfendale | 361/292 X |

*Primary Examiner*—Donald A. Griffin
*Attorney, Agent, or Firm*—Daniel W. Ernsberger

[57] ABSTRACT

A variable area capacitance transducer for measurement of length and displacement is disclosed. The preferred embodiment uses three concentric cylinders. The innermost cylinder acts as a working electrode, the middle cylinder acts as a common electrode, and the outer cylinder, a reference electrode. A movable concentric cylinder acts as a shield and is guided for movement between the working and common electrodes. The capacitance of the transducer is related to the displacement of the shield.

7 Claims, 1 Drawing Sheet

VARIABLE CAPACITANCE

BACKGROUND OF THE INVENTION

Capacitance transducers have been used for accurate, high resolution, length and displacement measurements. Capacitance is a linear, continuous function of capacitor plate area.

Variable area capacitance transducers measure length and displacement by varying the effective area of a capacitor. This is accomplished by interposing a shield between the plates of a variable capacitor. This approach is inherently linear and gives good performance over a wide displacement range (up to 10 inches or more).

Environmental effects (humidity and temperature) and stray and fringe capacitance, and mechanical design details place practical limitations on accuracy. Practical implementations of these devices introduce a reference capacitor and employ capacitance ratios of the variable and reference capacitors rather than absolute capacitance values of the variable capacitor. The displacement of the shield is then proportional to the ratio of capacitances between two capacitors. Air dielectrics are common, so transducer capacitance is quite small, typically less than one picofarad. Accordingly, any stray capacitance adversely affects the measurement. The problem posed by the stray capacitances is met by using a single electrode common to both capacitors and by carrying out measurements by applying a voltage between the two capacitors in such a way that the common electrode is forced to virtual ground when measurements are being taken. The voltage required to reach virtual ground is proportional to the displacement of the shield.

Several transducer configurations are described in the literature: U.S. Pat. Nos. 3,702,957, 3,566,222, and 3,570,003.

The usual configuration involves two concentric cylinders. The inner cylinder acts as a common center electrode. The outer cylinder is split around its circumference to form two tandem cylinders; the first acting as a reference electrode and the second a working electrode. A movable concentric cylinder passes through the annular space between the working and common electrode and changes the effective area of the working electrode in an amount proportional to its displacement.

Environmental effects and stray and fringe capacitance, and mechanical design details continue to place practical limitations on accuracy. The present invention serves to minimize these limitations.

SUMMARY OF THE PRESENT INVENTION

A novel triaxial configuration of the variable capacitance transducer substantially improves the accuracy and linearity of the measurement device. This configuration uses three concentric cylinders. In the preferred embodiment, the inner most cylinder acts as a working electrode, the middle cylinder a common electrode and the outer cylinder a reference electrode. A movable concentric cylinder acting as a shield is guided for movement through the annular space between the working and common electrodes. Air is the preferred dielectric. It is preferred that the shield be a conductor.

Although a cylindrical geometry with the working electrode in the center is preferred, other geometries are possible such that a first and second electrode are in a uniformly spaced relation with respect to one another. A common electrode is in a uniformly spaced relation between the first and second electrodes and electrically separates the first and second electrodes. A shield is guided for movement between the first and common electrodes to vary only said capacitance associated with the first and common electrodes.

The relationship between the displacement of the shield and the output of the transducer is linear only to the extent that the spacing between the first and common electrodes is uniform. The spacing of the electrodes should be as uniform as practical.

Measurements are made as described in the background of the invention. A voltage is applied to the working and reference electrodes so as to drive the common to virtual ground. The applied voltage varies according to the position of the shield.

The triaxial arrangement has distinct advantages over the tandem coaxial one including: (1) for the same measurement span, the device is shorter. This more compact structure reduces disturbing transient ambient temperature and some of the humidity effects; (2) the structure is also easier to fabricate. It is difficult to physically support a tandem electrode structure and maintain uniform spacing between the electrodes. The ease of fabrication of triaxial design facilitates optimization through use of shielding guarding and grounding of stray capacitance and the use of machinable ceramic material with coefficients of expansion that match the metallic parts. (3) the fringe capacitances of the two capacitors do not interact and (4) the reference electrode length and airgap dimensions can be changed without affecting the variable capacitor or the overall device length. This facilitates design optimization for high sensitivity and low noise in conjunction with the electronic signal processing circuitry. In particular the length of the reference electrode (which determines the gain in the transducer) and the gain in the electronic circuits can be selected so that the noise in the measurement system is reduced.

GENERAL DESCRIPTION OF THE DRAWINGS

DETAILED DESCRIPTION OF THE INVENTION

Figure 1:
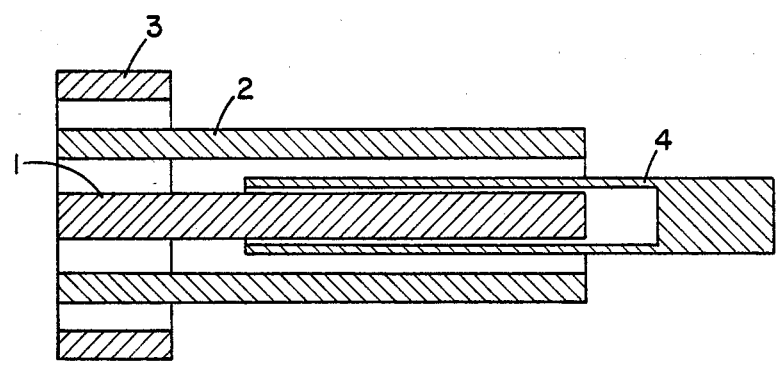
FIG. 1 is a drawing of the triaxial design.

In FIG. 1, number 1 is a first electrode, number 2 is a common electrode, and number 3 is a second electrode. The shield, number 4 is movable and can be guided in and out of the space between the first electrode and the common electrode.

Figure 2:
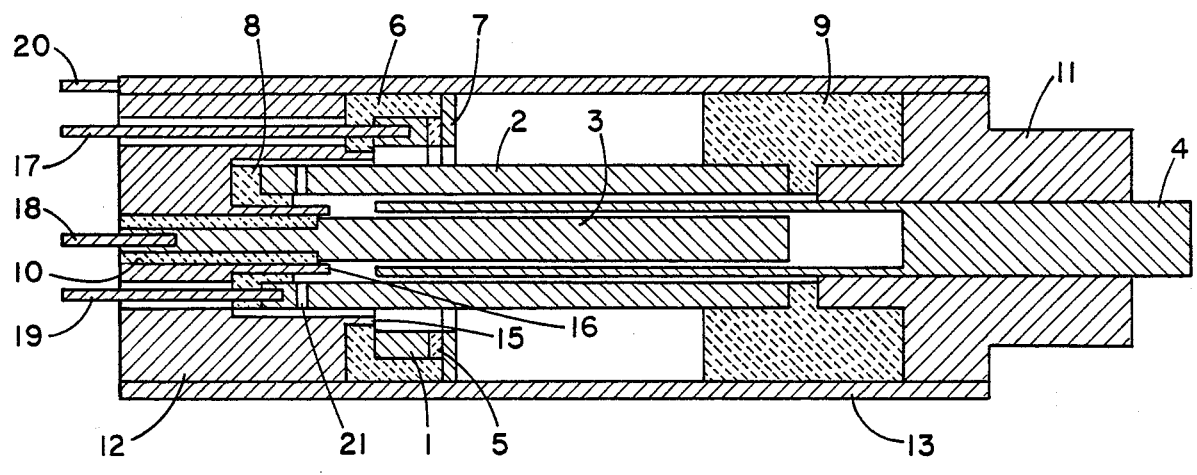
FIG. 2 is cut away view of the interior of a triaxial variable capacitance transducer.

FIG. 2 is a cut away view of the preferred design showing three concentric cylinder electrodes. Number 1 is a reference electrode, 2 is a common electrode, and 3 is a working electrode. The working electrode 3, is the innermost electrode and the working and reference electrodes are separated by the common electrode. The shield, 4, is a cylindrical shaft and is movably guided so that it can pass between the working and common electrodes.

The reference electrode, 1, is supported and electrically insulated from the other electrodes by a ceramic washer, 5, and the reference electrode ceramic support, 6. Number 7 is a conductive washer and acts as a guard.

It traps stray electric field lines and shorts stray currents to ground. The common electrode, 2, is supported and electrically insulated from other electrodes by a rear ceramic support, 8, and a front ceramic support, 9. It is preferred that the rear ceramic support 8, and the reference electrode, ceramic support 6, be two separate pieces. The working electrode, 3, is supported and insulated by a ceramic bushing 10. The shield, 4, is guided for movement by a bearing 11, and the overall device is supported and grounded by the main support, 12 and the outer sleeve 13. The rear of the main support extends forward to form a tubular and stationary shield 15, at the edge of the reference electrode 1, and a second tubular stationary shield 16, between the common and working electrodes. The tubular shields serve the additional function of guarding the electrode, from stray electric field lines and directs stray currents to ground. The reference, working and common electrodes along with the outer sleeve are connected to the electronic package through leads 17, 18, 19, and 20.

When the transducer is machined to close tolerance intermixing of the air dielectric in the reference and working capacitors is limited. This could cause transient humidity effects. Under these circumstances an air circulation, hole, 21, can be drilled through the counter electrode or one of the supports can be modified to provide means for air exchange within the transducer.

Figure 3:
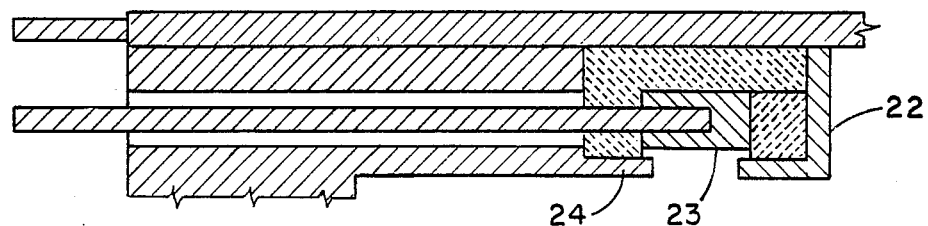
FIG. 3 is a cut away view of a portion of the transducer to illustrate a method for guarding the reference electrode.

FIG. 2 illustrates two forms of guarding, the washer, 7, is perpendicular to the surface of the common electrode, whereas the stationary tubular shield of the main rear support, 15, is parallel to the surface of the electrodes. FIG. 3 shows a preferred variation on guarding. The guarding can be extended so that it partially separates electrodes thereby partially shielding one electrode from another. The conductive washer 22, in FIG. 3, is extended around the reference electrode, 23. The tubular and stationary shield 24, extends over the surface of the electrode.

The device described here is to be used for measurements down to accuracies of 100 ppm and, dimensional changes resulting from temperature fluctuations cannot be ignored. The triaxial design is such, that dimensional changes cancel; however, it is preferred that all the structural components be manufactured of materials of nearly equal temperature coefficients of expansion.

We claim:

1. A variable capacitance position transducer comprising support means;
   a first and second electrode connected by the support means in a uniformly spaced relation with respect to one another;
   a common electrode connected with the support means in a uniformly spaced relation between the first and second electrodes and electrically separating said first and second electrodes, thereby, to define a first and second capacitance between said common electrode and said first and second electrodes respectively;
   and shield means connected with said support means for movement between the first and common electrodes to vary only said first capacitance,
Whereby the ratio of the first and second capacitance varies in accordance with the displacement of said shield means relative to said first electrode.

2. The transducer as in claim 1, wherein the first, second, and common electrode are concentric cylinders; wherein the first electrode is the inner most cylinder, the common electrode is the middle cylinder, and the second electrode is the outer cylinder; and wherein said shield is cylindrical and has an tubular portion that extends in a coaxially concentrically spaced relation solely between said common and first electrodes.

3. The transducer as in claim 2, wherein the support means has a stationary conductive tubular portion that extends coaxially and concentrically spaced relation between said common and second electrodes.

4. The transducer as in claim 2, wherein the support means further comprises a guard in the shape of a washer, that is colinearly arranged and axially spaced relation with the second electrode.

5. The transducer in claim 2, wherein the support means comprises a ceramic bushing that maintains the alignment of the common electrode; and further comprises a separate ceramic support for the second electrode to maintain the alignment of the second electrode.

6. The transducer of claim 5, wherein the electrodes and support means comprise materials with nearly equal coefficients of thermal expansion.

7. The transducer of claim 2, wherein the support means further comprises means for air exchange to assist air circulation within the transducer.

* * * * *